United States Patent
Ratcliffe et al.

(10) Patent No.: US 12,373,812 B2
(45) Date of Patent: Jul. 29, 2025

(54) EXPANDABLE BAGGING SYSTEM

(71) Applicant: Toshiba Global Commerce Solutions, Inc., Durham, NC (US)

(72) Inventors: John Ratcliffe, Durham, NC (US); Brad M. Johnson, Raleigh, NC (US); Robert Andrew Myers, Cary, NC (US); William L. Dungan, Cary, NC (US)

(73) Assignee: Toshiba Global Commerce Solutions, Inc., Durham, NC (US)

( * ) Notice: Subject to any disclaimer, the term of this patent is extended or adjusted under 35 U.S.C. 154(b) by 193 days.

(21) Appl. No.: 18/074,058

(22) Filed: Dec. 2, 2022

(65) Prior Publication Data

US 2024/0185206 A1    Jun. 6, 2024

(51) Int. Cl.
*G06Q 20/00* (2012.01)
*G06Q 20/18* (2012.01)
*G06Q 20/20* (2012.01)

(52) U.S. Cl.
CPC ........... *G06Q 20/208* (2013.01); *G06Q 20/18* (2013.01)

(58) Field of Classification Search
CPC .... G06Q 20/208; G06Q 20/18; G07G 1/0072; G07G 1/0018
USPC ......................................................... 705/23
See application file for complete search history.

(56) References Cited

U.S. PATENT DOCUMENTS

| | | | |
|---|---|---|---|
| 8,161,891 B2 | 4/2012 | Palese | |
| 9,275,526 B2* | 3/2016 | Skiles | G07G 1/12 |
| 10,043,168 B1* | 8/2018 | Catoe | G06Q 20/18 |
| 11,755,989 B2* | 9/2023 | Rodriguez | G08B 13/19645 |
| | | | 705/23 |
| 2008/0027817 A1* | 1/2008 | Iizaka | G06Q 20/01 |
| | | | 235/462.15 |
| 2013/0153656 A1* | 6/2013 | Skiles | G07G 1/009 |
| | | | 705/16 |
| 2021/0133720 A1* | 5/2021 | Johnson | G06Q 20/18 |
| 2021/0298496 A1 | 9/2021 | Yaguda | |

FOREIGN PATENT DOCUMENTS

CN    102060118 A  *  5/2011

* cited by examiner

*Primary Examiner* — Russell S Glass
(74) *Attorney, Agent, or Firm* — Kaufman & Canoles, P.C.

(57) ABSTRACT

Systems and methods of expanding a bagging system are provided. In one exemplary embodiment, a method is performed by a bagging station device configured to couple to a terminal station device. The bagging station device includes an outer expandable frame, an inner expandable frame having an inner movable mechanism coupled between first and second inner frame portions, first and second panels disposed on the corresponding first and second inner frame portions, and a set of load sensors coupled between the inner and outer expandable frames. The method includes sending, by each load sensor, to the terminal station device, a measurement of a load associated with one or more objects placed on a surface of the first or second panel. The inner moveable mechanism is configured to enable the first or second panel to move along a longitudinal plane of the inner expandable frame.

20 Claims, 10 Drawing Sheets

400b

401b — BY A TERMINAL STATION DEVICE CONFIGURED TO COUPLE TO A BAGGING STATION DEVICE, THE BAGGING STATION DEVICE HAVING AN OUTER EXPANDABLE FRAME, AN INNER EXPANDABLE FRAME HAVING AN INNER MOVABLE MECHANISM COUPLED BETWEEN FIRST AND SECOND INNER FRAME PORTIONS, FIRST AND SECOND PANELS DISPOSED ON THE CORRESPONDING FIRST AND SECOND INNER FRAME PORTIONS, AND A SET OF LOAD SENSORS DISPOSED BETWEEN THE INNER AND OUTER EXPANDABLE FRAMES, RECEIVE, FROM EACH LOAD SENSOR, AN INDICATION OF A MEASUREMENT OF A LOAD ASSOCIATED WITH ONE OR MORE OBJECTS PLACED ON A SURFACE OF THE FIRST, SECOND OR THIRD PANEL(S)

403b — DETERMINE THE LOAD OF THE ONE OR MORE OBJECTS PLACED ON THE SURFACE OF THE FIRST OR SECOND PANEL BASED ON THE LOAD MEASUREMENT(S) OF AT LEAST ONE LOAD SENSOR

405b — DETERMINE TO ENABLE MOVEMENT OF A ROLLER MECHANISM, WITH THE ROLLER MECHANISM BEING COUPLED TO AT LEAST ONE LEG SUPPORTING THE OUTER EXPANDABLE FRAME.

407b — SEND, TO A FIRST ACTUATOR COUPLED TO THE ROLLER MECHANISM, AN INDICATION TO ENABLE THE MOVEMENT OF THE ROLLER MECHANISM

409b — DETERMINE TO MOVE THE FIRST OR SECOND PANEL BETWEEN THE FULLY UNEXPANDED POSITION, THE FULLY EXPANDED POSITION, OR ANY POSITION IN BETWEEN

411b — SEND, TO A SECOND ACTUATOR COUPLED TO THE INNER OR OUTER MOVEABLE MECHANISM, AN INDICATION TO MOVE THE FIRST OR SECOND PANEL BETWEEN THE FULLY UNEXPANDED POSITION, THE FULLY EXPANDED POSITION, OR ANY POSITION IN BETWEEN

413b — DETERMINE TO LEVEL THE BAGGING STATION DEVICE

415b — SEND, TO A THIRD ACTUATOR COUPLED TO AT LEAST ONE LEG SUPPORTING THE OUTER EXPANDABLE FRAME, AN INDICATION TO LEVEL THE BAGGING STATION DEVICE, WITH THE THIRD ACTUATOR BEING OPERABLE TO LEVEL THE BAGGING STATION DEVICE

FIG. 4B

EXPANDABLE BAGGING SYSTEM

BACKGROUND

A self-checkout (SCO) or self-service checkout system is a machine that provides a mechanism for consumers to complete their own transaction from a retailer without needing a traditional staff-supported checkout. During self-checkout, a consumer scans a retail item barcode or weighs a retail item without a barcode and then select that item on a touchscreen display of a terminal station of the self-checkout system. Once the item is scanned, the consumer will typically place the scanned item into a bagging area of the self-checkout system. A frictionless checkout system includes various technologies and processes to make retail shopping faster and easier for consumers. Further, frictionless checkouts ease and speed the buying process in an effort to make shopping transactions faster, simpler, less stressful and more enjoyable to consumers.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

FIG. 4B illustrates one embodiment of a method by a terminal station device of expanding the bagging station device with various aspects as described herein.

DETAILED DESCRIPTION

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details.

Self-checkout systems continue to evolve their functionality and aesthetics to provide a better consumer experience while requiring less retail floor space and providing a more modern design. Further, the space needed to ship each self-checkout system has generally been reduced, resulting in improved shipping costs. However, these space improvements have caused certain challenges such as the inability of cleaning equipment to reach under the space below the bagging area of a self-checkout system. Instead, retailers may need to clean the space below the bagging area by hand, increasing maintenance costs. Further, retailers may prefer the flexibility to adjust the surface area associated with the bagging area of the bagging station device. Accordingly, there is a need for improved techniques for expanding or reducing the surface area associated with the bagging area of the bagging station device. In addition, other desirable features and characteristics of the present disclosure will become apparent from the subsequent detailed description and embodiments, taken in conjunction with the accompanying figures and the foregoing technical field and background.

Figure 1A:
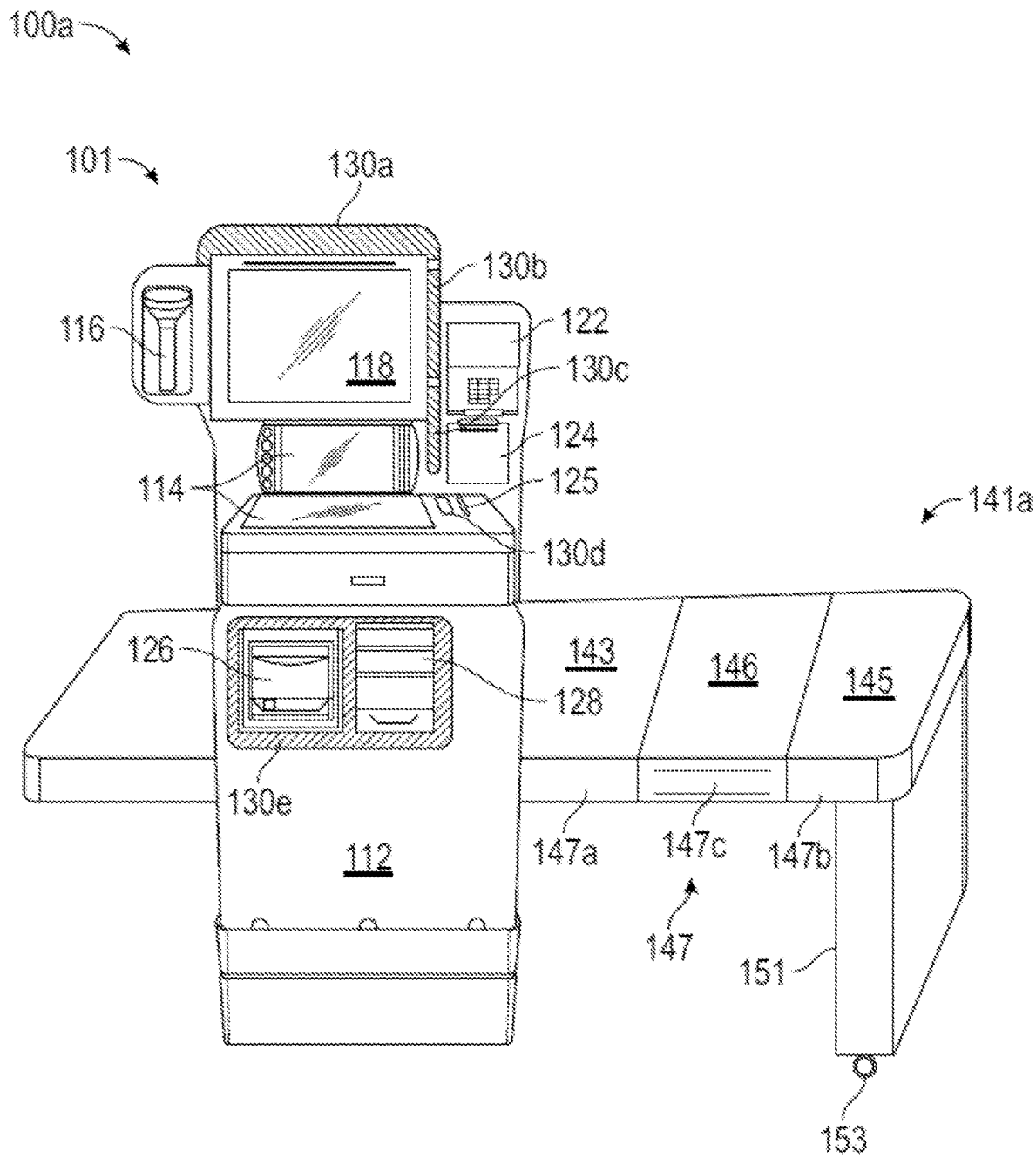
FIG. 1A illustrates one embodiment of a self-checkout system having a terminal station device and a bagging station device in accordance with various aspects as described herein.

In this disclosure, systems and methods of expanding or reducing a bagging station device of a self-checkout system are provided. In one exemplary embodiment, a bagging station device can be configured with rails or slides built into the sides of the bagging station device such that the bagging station device can slide to the side of the self-checkout system so as to expand or reduce the associated bagging surface area. One of the benefits of this expansion of the bagging station device would enable access to the floor under the bagging station device so that cleaning equipment (e.g., buffer machine) can clean that floor. Another benefit would provide retailers the flexibility to adjust the size of the bagging area of each bagging station device such as by adding one or more panels to the bagging station device so as to increase the surface area of the bagging area. Another benefit would be maintaining the space needed to ship each self-checkout system while providing retailers the flexibility to increase the size of the bagging area of each bagging station device. In one example, FIG. 1A illustrates one embodiment of a self-checkout system 100a having a terminal station device 101 and a bagging station device 141a in accordance with various aspects as described herein. As shown in FIG. 1A, the terminal station device 101 can include a housing 112, one or more optical scanners 114, 116, a display device 118, a payment processing mechanism 122, a printer 124, a coupon slot mechanism 125, a cash acceptor mechanism 126, a change interface mechanism 128, the like, or any combination thereof. In addition, the terminal station device 101 can be configured to include a set of light emitting elements 130a-e (collectively, light emitting elements 130). The housing 112 can be configured to include a cabinet that contains one or more processing circuits operable to control the operations and functions of the self-checkout system 100a. Although not explicitly shown herein, the housing 112 can also contain cabling and other functional components that communicatively couple the self-checkout system 100a to a network or a network node device or that communicatively couple the terminal station device 101 to the bagging station device 141a. A network node device may include, for example, one or more server devices that may or may not be located in the retail store.

In FIG. 1A, each scanner 114, 116 can be configured as an optical scanner operable to scan a bar code displayed on retail items that a consumer intents to purchase. In one example, the scanner 116 can be configured as a hand-held, battery-operated scanner that the consumer removes from its battery charging dock to scan retail items without having to remove them from a shopping cart. For those situations where a retail item does not have a bar code, the scanner 114 can be operable to perform dual scanner and scale functions to allow the retail item to be contemporaneously scanned and weighed for purchase by a consumer. The display 118 can be operable to display information associated with retail items being purchased by a consumer. The payment processing mechanism 122 can be configured with a pinpad device operable to accept a non-cash payment vehicle (e.g., credit card or debit card), while the printer 124 can be configured to print receipts or coupons. The coupon slot mechanism 125 can include a generally elongated slot configured to receive coupons being redeemed by a consumer. The cash acceptor mechanism 126 can be operable to receive cash (e.g., paper money, coins) from the consumer for the retail items being purchased by the consumer. The change interface mechanism 128 can be operable to provide change to the consumer in the form of paper money or coins.

The terminal station device 101 can also be configured to include a set of light emitting elements 130a-d (e.g., LEDs). The processing circuit is operable to control the light emitting elements 130a-d such as through software executed by the processing circuit. Each light emitting element 130a-e can be configured to be individually or collectively controlled by the processing circuit to indicate certain contextual information to a consumer. For example, the light emitting element 130a can be configured as a lane indicator that indicates whether the self-checkout system 100a is available or not available for self-checkout of retail items by a consumer. In another example, the light emitting element 130a can be configured as a bagging area adjustment indicator that indicates when the bagging area is being expanded or reduced such as for cleaning under the bagging area. In another example, the light emitting element 130b can be configured as a pinpad indicator that indicates that a consumer can begin utilizing the payment processing mechanism 122 to provide payment for the scanned retail items. The light emitting element 130c can be configured as a printer indicator that indicates when the printer 124 is printing a receipt or a coupon to use on a future visit. The light emitting element 130d can be configured as a coupon slot indicator that indicates when and where a consumer can insert coupons being redeemed into the coupon slot mechanism 125. The light emitting element 130e can be configured as a cash interface indicator that indicates when a consumer should input cash or change into the cash acceptor mechanism 126, as well as when a consumer can remove any change due from the change interface mechanism 128.

Figure 1B:
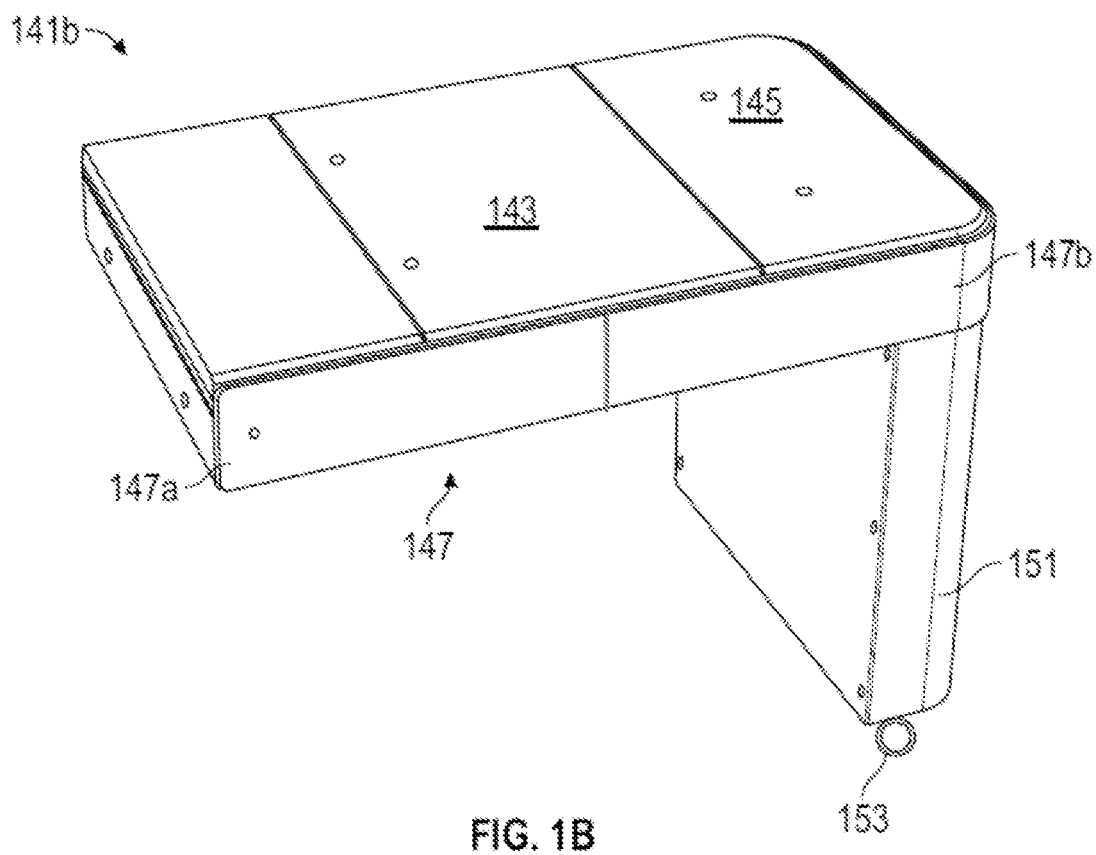
FIGS. 1B-F illustrate embodiments of the bagging station component of FIG. 1 in accordance with various aspects as described herein.
Figure 1C:
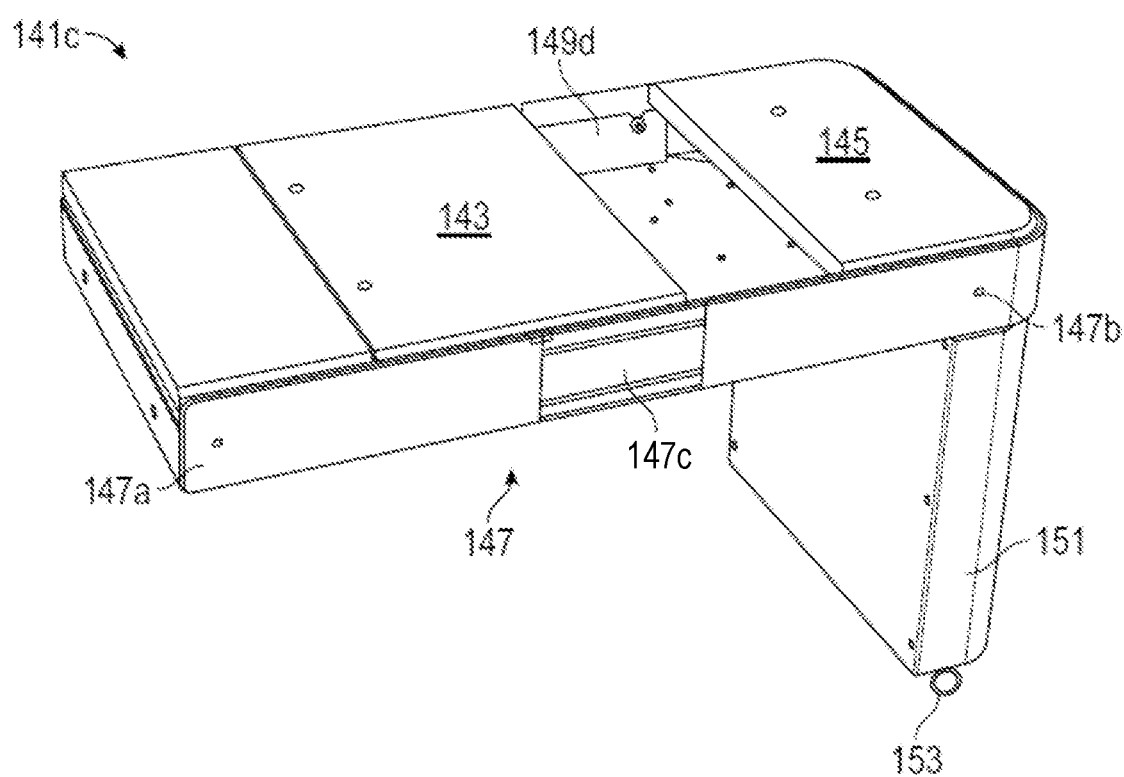
Figure 1D:
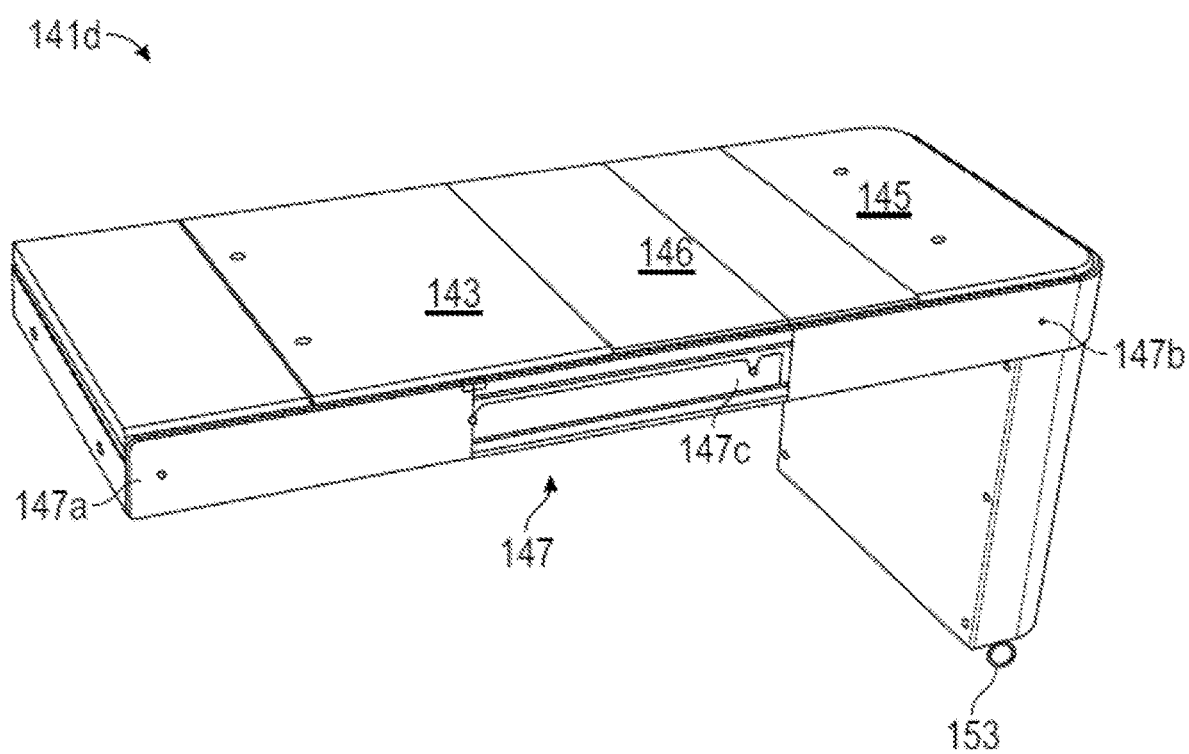

In FIGS. 1A-F, the bagging station device 141a-f is configured to operatively couple to the terminal station device 101. The bagging station device 141a-f can include first and second panels 143, 145, an outer expandable frame 147, an inner expandable frame 149, the like, or any combination thereof. The outer expandable frame 147 can include first and second outer frame portions 147a-b (e.g., linear sliding rails), outer moveable mechanisms 147c-d (e.g., linear sliding rails), the like, or any combination thereof. The inner expandable frame 149 can include first and second inner frame portions 149a-b, inner moveable mechanisms 149c-d, the like, or any combination thereof. The first and second panels 143, 145 can be disposed on the corresponding first and second inner frame portions 149a-b. The inner moveable mechanisms 149c-d can be configured to enable the first or second panel 143, 145 to move along a longitudinal plane of the inner expandable frame 149 between a fully unexpanded position (as shown in FIG. 1B) and a fully expanded position (as shown in FIG. 1D), as well as any position in between (such as shown in FIG. 1C). When the inner expandable frame 149 is in the fully expanded position, a third panel 146 can be disposed on the corresponding inner frame portion associated with the inner moveable mechanisms 149c-d, with the first, third, and second panels 143, 146, 145 forming a contiguous bagging surface. When the inner expandable frame 149 is in the fully unexpanded position, the first and second panels 143, 145 form a contiguous bagging surface.

Figure 1E:
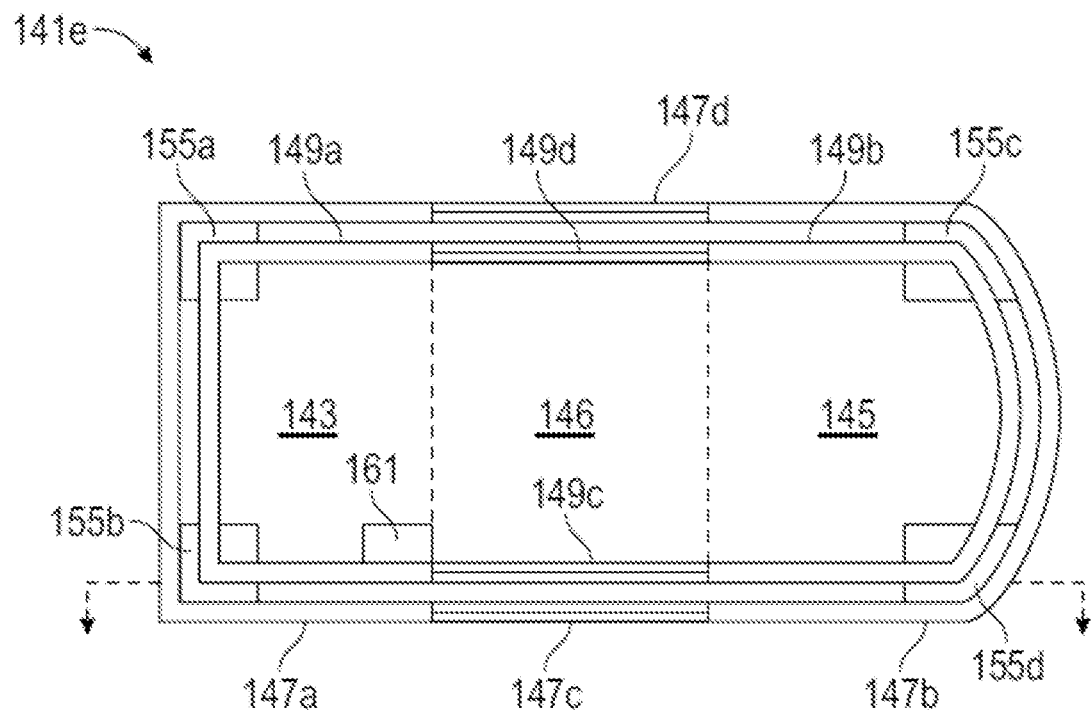
Figure 1F:
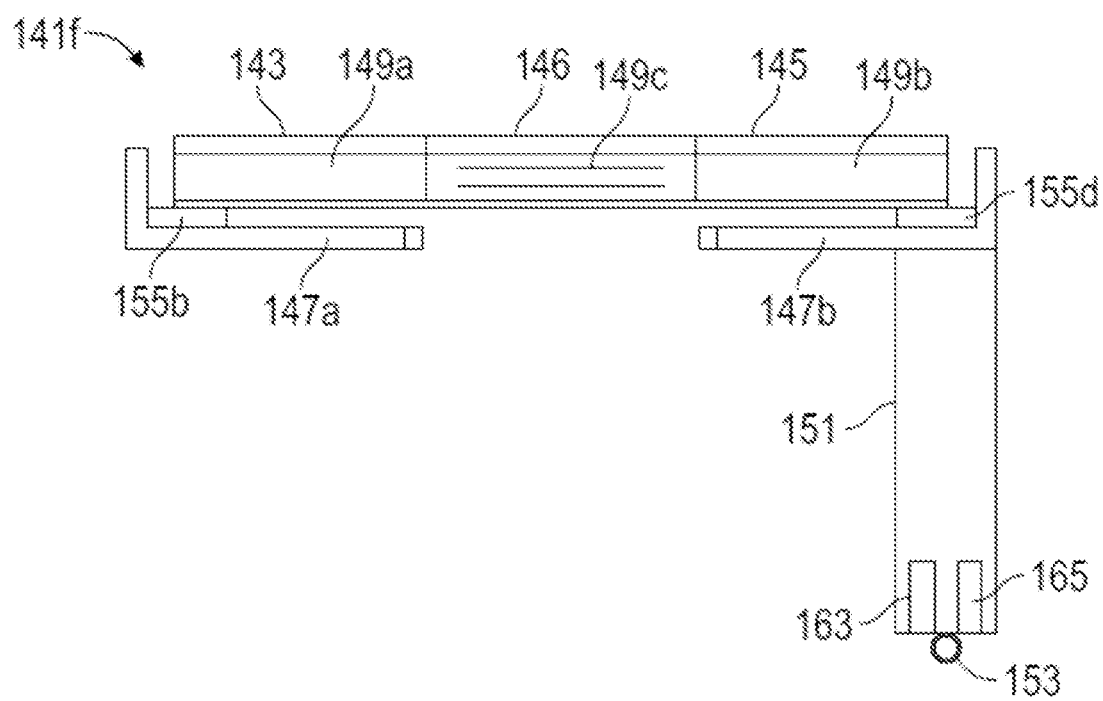

As shown in FIGS. 1E-F, a set of load sensors 155a-d can be disposed between the outer and inner expandable frames 147, 149 such that the set of load sensors 155a-d bears the load (e.g., weight) of the inner expandable frame 149, any first, second or third panels 143, 145, 146 disposed on the inner expandable frame 149, and any objects (e.g., retail items) placed on the surface of those disposed panels 143, 145, 146. Further, each load sensor 155a-d is operable to measure a load of any objects placed on the first, second or third panel(s) 143, 145, 146, including when the inner expandable frame 149 is in the fully unexpanded position, the fully expanded position, or any position in between.

In operation, each load sensor 155a-d obtains a measurement of a load associated with one or more objects placed on the surface of the first, second or third panel(s) 143, 145, 146, and then sends, to a processing circuit of the terminal station device 101, an indication of the load measurement. The processing circuit of the terminal station device 101 can receive, from at least one load sensor 155a-d, the indication of the load measurement and then determine the load of the one or more objects placed on the surface of the first, second or third panel(s) 143, 145, 146 based on the load measurements from the at least one load sensor 155a-d.

In another embodiment, the bagging station device 114a-f further includes a roller mechanism 153 (e.g., wheel, caster) coupled to a bottom end of one or more legs 151 of the bagging station device 114a-f. The roller mechanism 153 is operable to enable the inner moveable mechanisms 149c-d to move along a longitudinal plane of the inner expandable frame 149 between a fully unexpanded position, a fully expanded position, or any position in between.

In another embodiment, the processing circuit of the terminal station device 101 can determine to enable movement of the roller mechanism 153 between the fully unexpanded position, the fully expanded position, or any position in between, with the roller mechanism 153 being coupled to at least one leg 151 supporting the outer expandable frame 147. The processing circuit of the terminal station device 101 can send, to a first actuator 163 (e.g., lock actuator) of the bagging station device 114a-f, an indication to enable movement of the roller mechanism 153. The first actuator 163 is operable to enable (e.g., unlock) or disable (e.g., lock) the movement of the roller mechanism 153. A skilled artisan will readily recognize techniques for enabling and disabling the movement of a roller mechanism by an actuator. In response, the first actuator 163 can enable the movement of the roller mechanism 153 so that the first or second panel 143, 145 can move along the longitudinal plane of the inner expandable frame 149 between the fully unexpanded position, the fully expanded position, or any position in between.

In another embodiment, the processing circuit of the terminal station device 101 can determine to move the first or second panel 143, 145 along the longitudinal plane of the inner expandable frame 149 between the fully unexpanded position, the fully expanded position, or any position in between. The processing circuit of the terminal station device 101 can send, to a second actuator 161 (e.g., linear actuator) of the bagging station device 114a-f, an indication to move the outer or inner moveable mechanism 147c-d, 149c-d so as to move the first or second panel 143, 145 along the longitudinal plane of the inner expandable frame 149 between the fully unexpanded position, the fully expanded position, or any position in between. The second actuator 161 can be operable to move the outer or inner moveable mechanism 147c-d, 149c-d. A skilled artisan will readily recognize techniques for moving an object along a plane by an actuator. In response, the second actuator 161 can move the outer or inner moveable mechanism 147c-d, 149c-d so as to move the first or second panel 143, 145 along the longitudinal plane of the inner expandable frame 149 between the fully unexpanded position, the fully unexpanded position, or any position in between.

In another embodiment, the processing circuit of the terminal station device 101 can determine to level the bagging station device 114a-f. The processing circuit of the terminal station device 101 can send, to a third actuator 165 (e.g., leveling actuator) coupled to at least one leg 151 supporting the outer expandable frame 147, an indication to level the bagging station device 114a-f. The third actuator 165 can be operable to level the bagging station device 114a-f. A skilled artisan will readily recognize techniques for leveling an object by an actuator. In response, the third actuator 165 can level the bagging station device 114a-f so that the longitudinal plane of the inner expandable frame 149 is parallel to the surface that the bagging station device 114a-f is positioned.

Figure 2A:
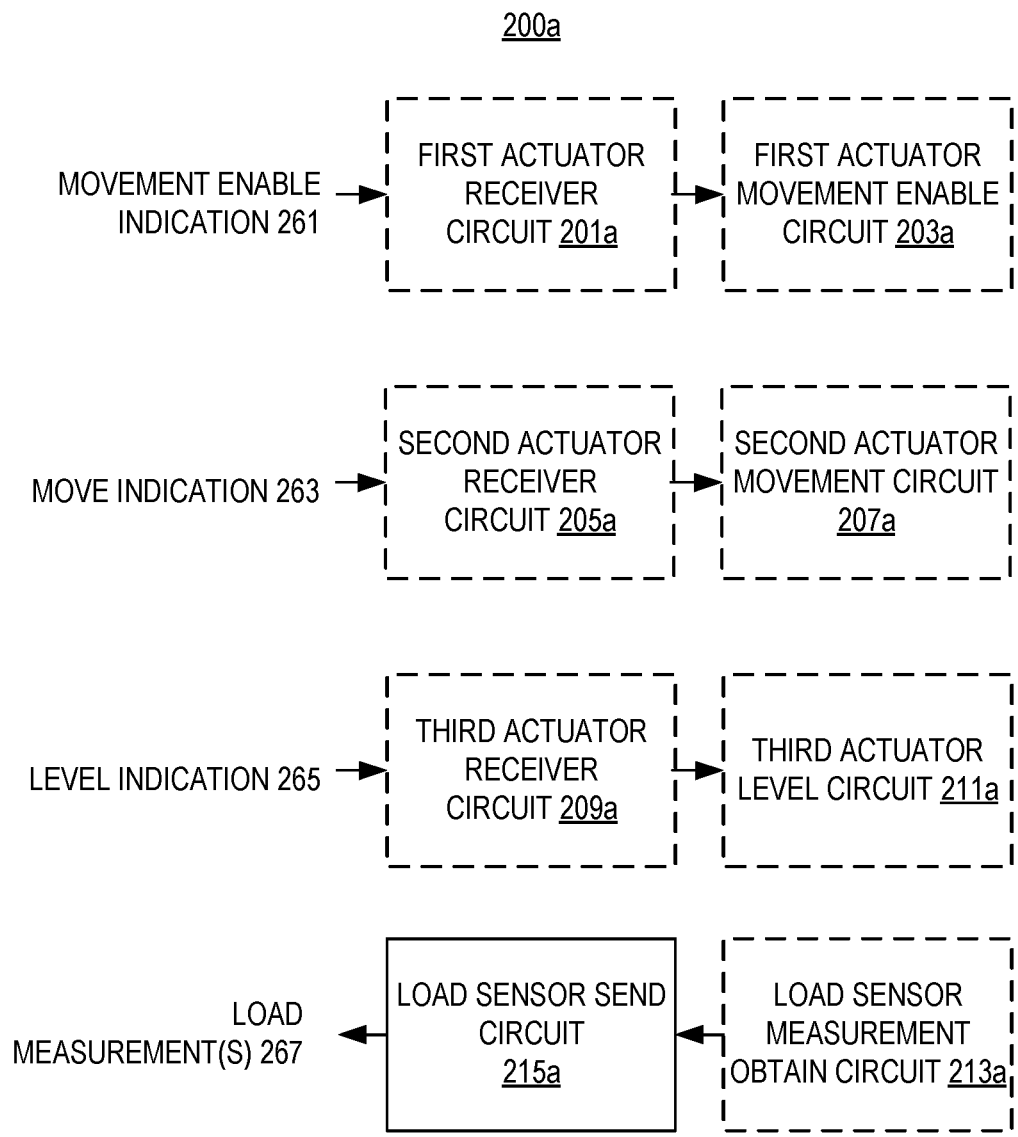
FIG. 2A illustrates one embodiment of a bagging station device in accordance with various aspects as described herein.

FIG. 2A illustrates one embodiment of a bagging station device 200a in accordance with various aspects as described herein. In FIG. 2A, the device 200a implements various functional means, units, or modules (e.g., via the processing circuitry 301a in FIG. 3A, via the processing circuitry 502 in FIG. 5, via software code, or the like), or circuits. In one embodiment, these functional means, units, modules, or circuits (e.g., for implementing the method(s) described herein) may include for instance: a first actuator receiver circuit 201a operable to receive, by the first actuator coupled to the roller mechanism of at least one leg supporting the outer expandable frame of the bagging station device 200a, from a terminal station device, an indication 261 to enable movement of the roller mechanism; a first actuator movement enable circuit 203a operable to enable, by the first actuator, the movement of the roller mechanism; a second actuator receiver circuit 205a operable to receive, by the second actuator coupled to the outer or inner movable mechanism of the outer or inner expandable frame of the bagging station device 200a, from the terminal station device, an indication 263 to move the outer or inner movable mechanism; a second actuator movement circuit 207a operable to move, by the second actuator, the outer or inner movable mechanism; a third actuator receiver circuit 209a operable to receive, by a third actuator coupled to at least one leg supporting the outer expandable frame, from the terminal station device, an indication 265 to level the bagging station device 200a; a third actuator level circuit 211a operable to level, by the third actuator, the bagging station device 200a; a load sensor measurement obtain circuit 213a operable to obtain, by each load sensor disposed between the outer and inner expandable frames of the bagging station device 200a, a load measurement associated with one or more objects placed on the surface of the first, second or third panel(s); and a load sensor send circuit 215a operable to send, by each load sensor, to the terminal station device, an indication 267 of the load measurement.

Figure 2B:
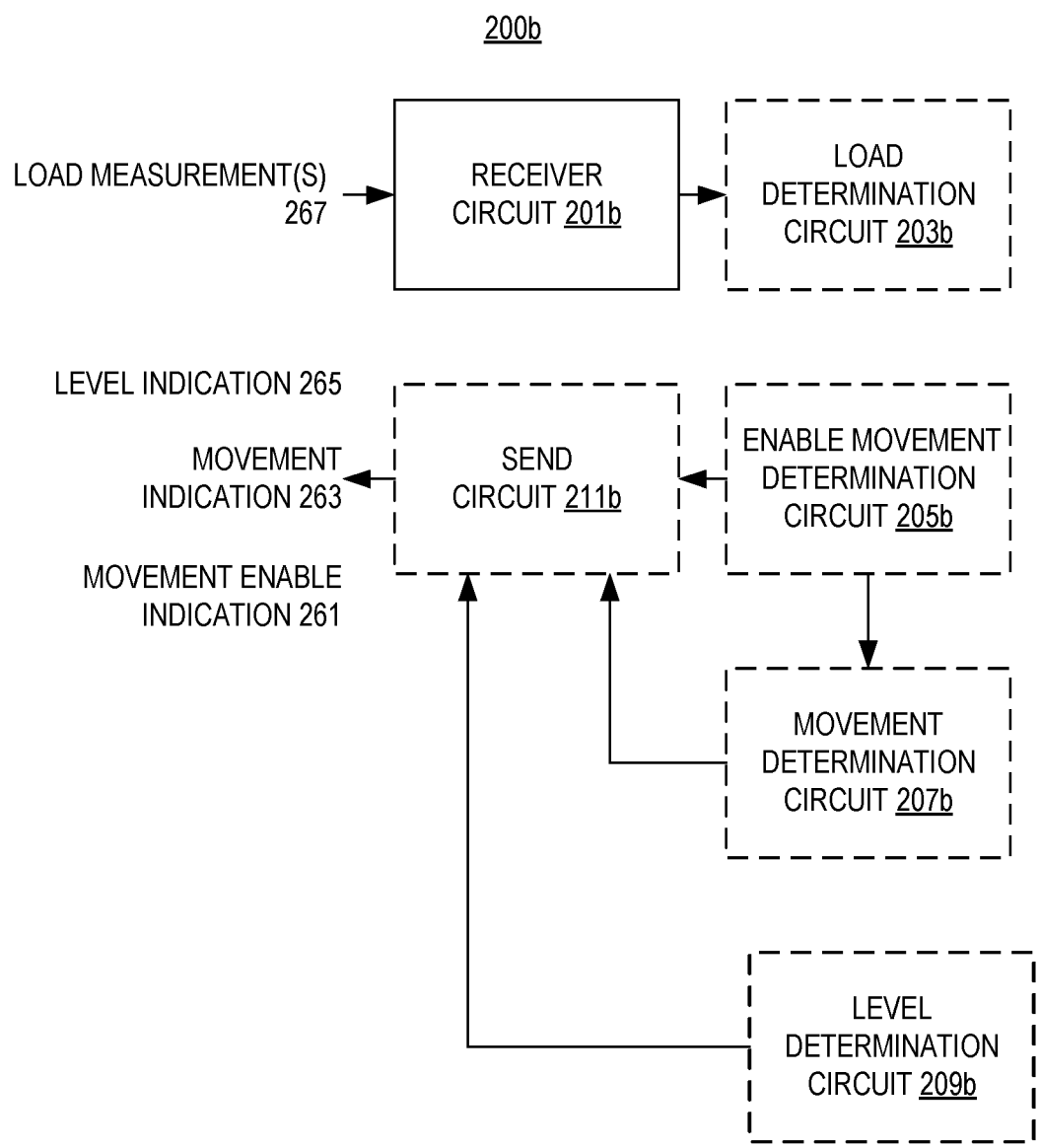
FIG. 2B illustrates one embodiment of a terminal station device in accordance with various aspects as described herein.

FIG. 2B illustrates one embodiment of a terminal station device 200b in accordance with various aspects as described herein. In FIG. 2B, the device 200b implements various functional means, units, or modules (e.g., via the processing circuitry 301c in FIG. 3C, via the processing circuitry 502 in FIG. 5, via software code, or the like), or circuits. In one embodiment, these functional means, units, modules, or circuits (e.g., for implementing the method(s) described herein) may include for instance: a receiver circuit 201b operable to receive, from each load sensor, an indication 267 of a load measurement associated with one or more objects placed on the surface of the first, second or third panel(s); a load determination circuit 203b operable to determine the load of the one or more objects placed on the surface of the first, second or third panel(s); an enable movement determination circuit 205b operable to determine to enable movement of the roller mechanism; a movement determination circuit 207b operable to determine to move the inner moveable mechanisms; a level determination circuit 209b operable to determine to level the bagging station device; and a send circuit 211b operable to send, to the first, second, or third actuators, information such as the respective indications 261, 263, 265.

Figure 3A:
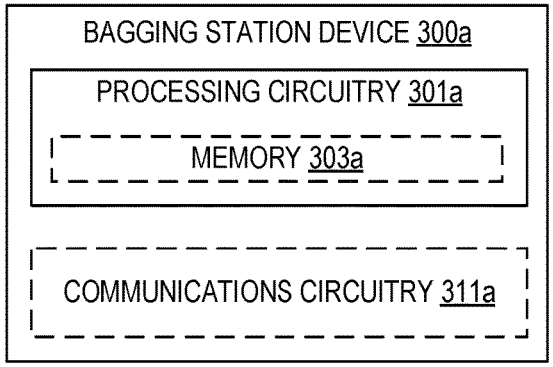
FIGS. 3A-B illustrate other embodiments of a bagging station device in accordance with various aspects as described herein.
Figure 3B:
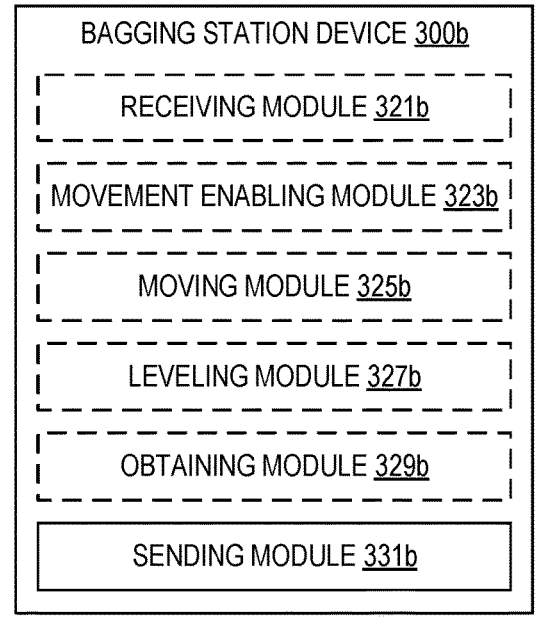

FIGS. 3A-B illustrate other embodiments of a bagging station device 300a-b in accordance with various aspects as described herein. In FIG. 3A, the device 300a may include processing circuitry 301a that is operably coupled to one or more of the following: memory 303a, network communications circuitry 305a, the like, or any combination thereof. The network communication circuitry 305a is configured to transmit or receive information to or from one or more other devices via any communication technology. The processing circuitry 301a is configured to perform processing described herein, such as by executing instructions stored in memory 303a. The processing circuitry 301a in this regard may implement certain functional means, units, or modules.

Figure 5:
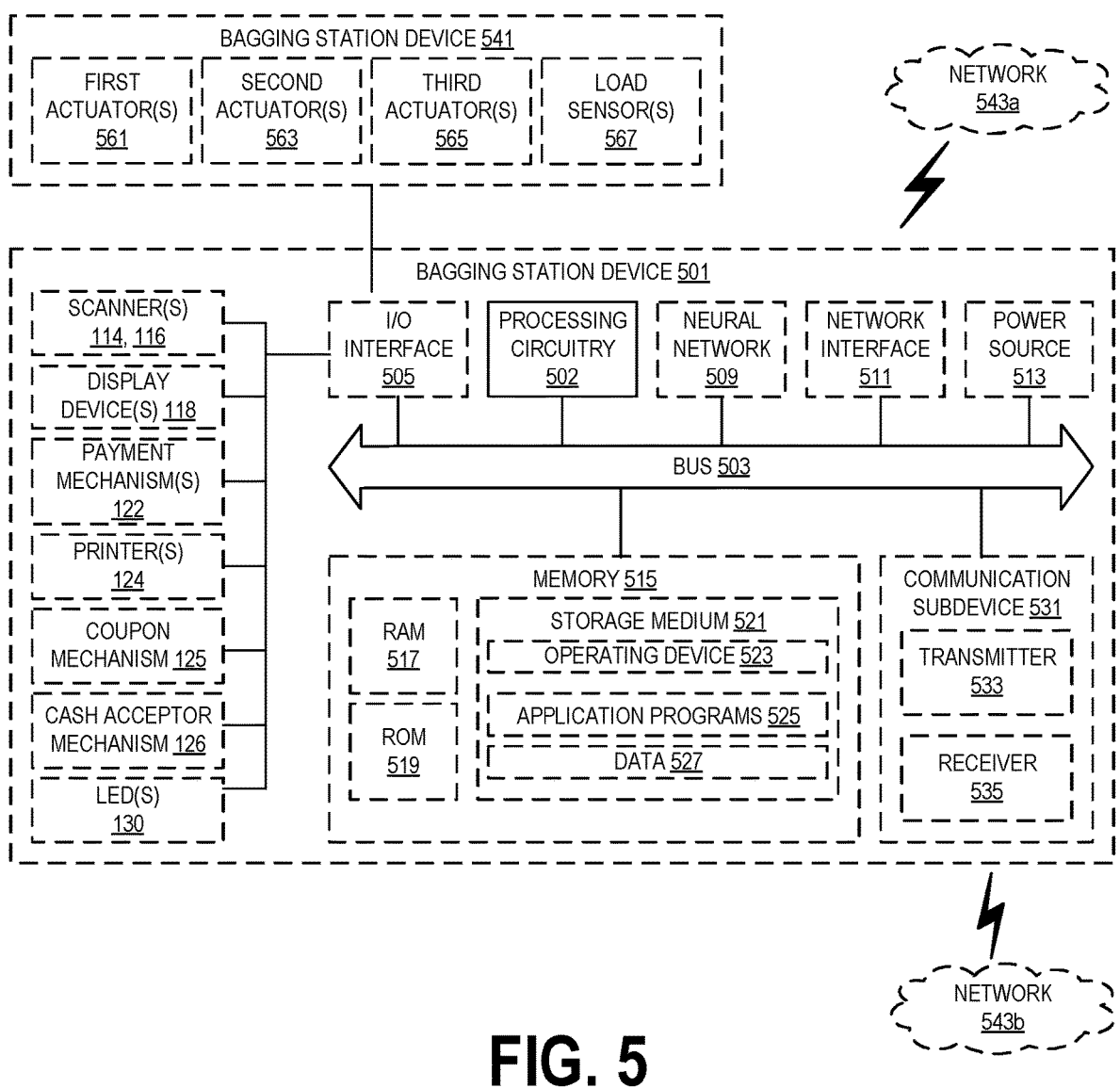
FIG. 5 illustrates another embodiment of a self-checkout system having a terminal station device and a bagging station device in accordance with various aspects as described herein.

In FIG. 3B, the device 300b implements various functional means, units, or modules (e.g., via the processing circuitry 301a in FIG. 3A, via the processing circuitry 502 in FIG. 5, via software code, or the like). In one embodiment, these functional means, units, or modules (e.g., for implementing the method(s) described herein) may include for instance: a receiving module 321b for receiving, by the first, second, or third actuator, from the terminal station device, information; a movement enabling module 323b for enabling, by the first actuator, the movement of the roller mechanism; a moving module 325b for moving, by the second actuator, the outer or inner moveable mechanism; a leveling module 327b for leveling, by the third actuator, the bagging station device; an obtaining module 329b for obtaining, by each load sensor, a load measurement associated with one or more objects placed on the surface of the first, second or third panel(s); and a sending module 331b for sending, by each load sensor, to the terminal station device, an indication of the load measurement.

Figure 3C:
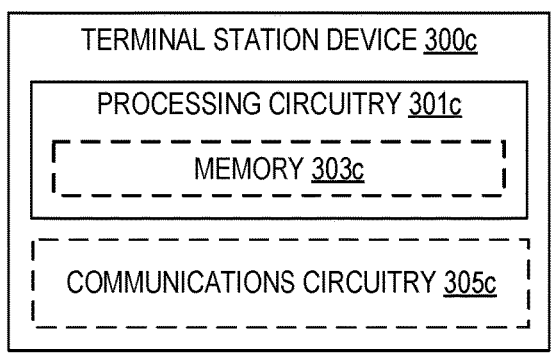
FIGS. 3C-D illustrate other embodiments of a terminal station device in accordance with various aspects as described herein.
Figure 3D:
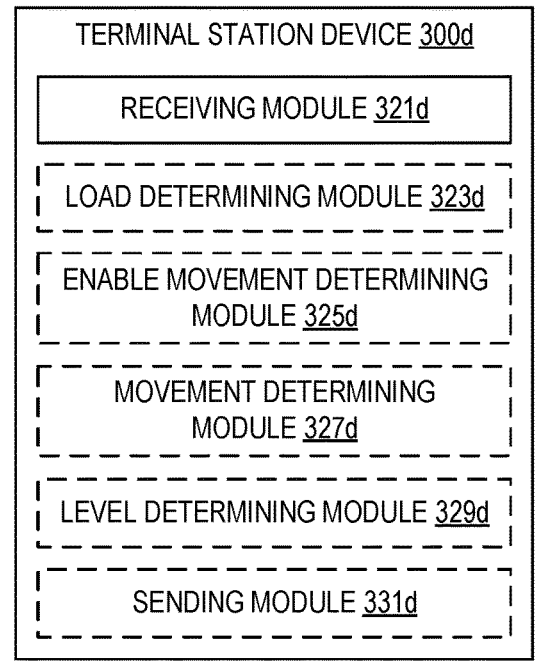

FIGS. 3C-D illustrate other embodiments of a terminal station device 300c-d in accordance with various aspects as described herein. In FIG. 3C, the device 300c may include processing circuitry 301c that is operably coupled to one or more of the following: memory 303c and network communications circuitry 305c, the like, or any combination thereof. The network communication circuitry 305c is configured to transmit or receive information to or from one or more other devices via any communication technology. The processing circuitry 301c is configured to perform processing described herein, such as by executing instructions stored in memory 303c. The processing circuitry 301c in this regard may implement certain functional means, units, or modules.

In FIG. 3D, the device 300d implements various functional means, units, or modules (e.g., via the processing circuitry 301c in FIG. 3C, via the processing circuitry 502 in FIG. 5, via software code, or the like). In one embodiment, these functional means, units, or modules (e.g., for implementing the method(s) described herein) may include for instance: a receiving module 321d for receiving, from each load sensor, an indication of a load measurement associated with one or more objects placed on the surface of the first, second or third panel(s); a load determining module 323d for determining the load of the one or more objects placed on the surface of the first or second panel based on the load measurement(s) of at least one load sensor; an enable movement determining module 325d for determining to enable movement of the roller mechanism; a movement determining module 237d for determining to move the inner moveable mechanisms; a level determining module 329d for determining to level the bagging station device; and a sending module 331d for sending, to the first, second, or third actuators, information.

Figure 4A:
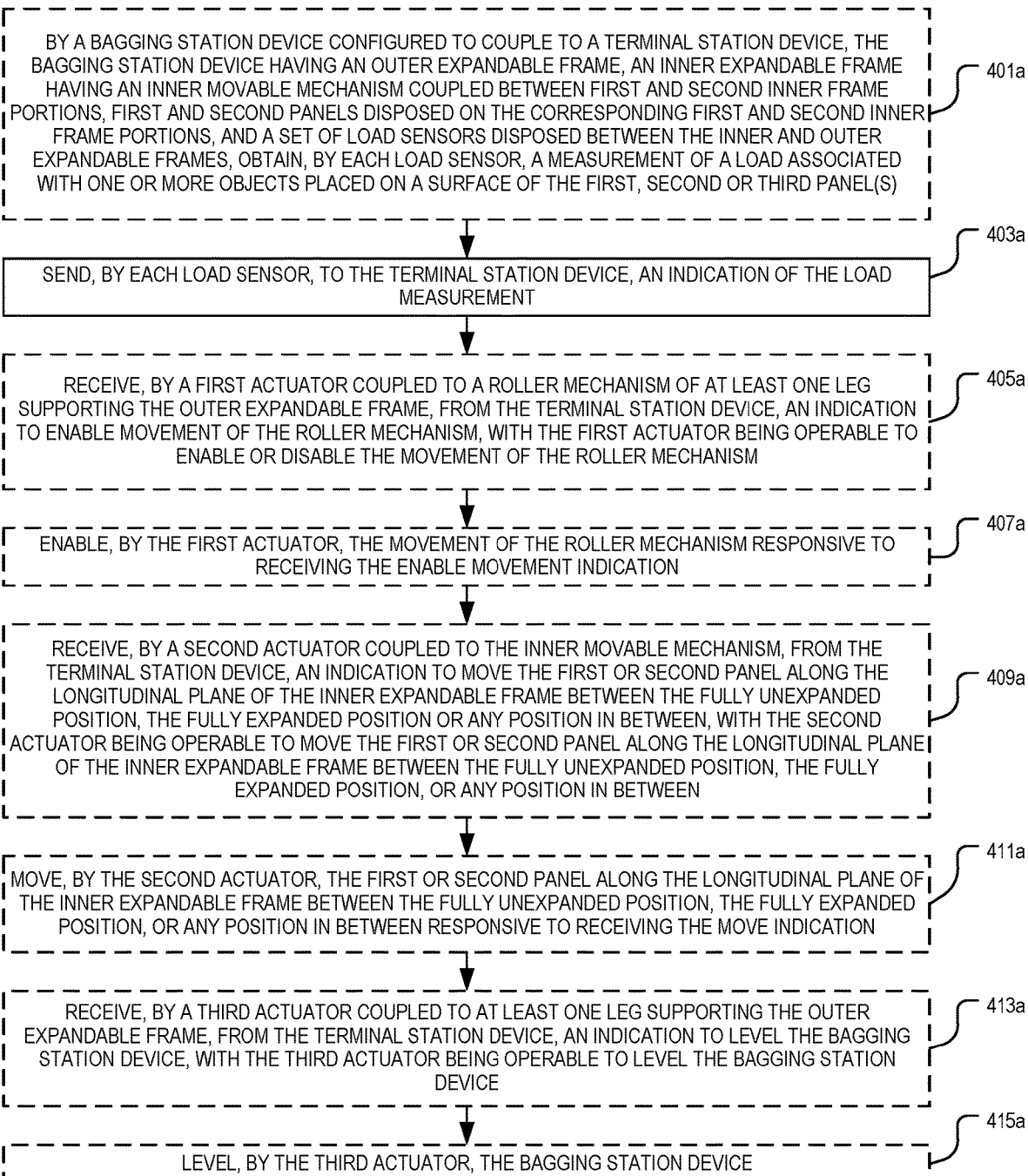
FIG. 4A illustrates one embodiment of a method by a bagging station device of expanding the bagging station device with various aspects as described herein.

FIG. 4A illustrates one embodiment of a method 400a by a bagging station device of expanding the bagging station device with various aspects as described herein. In FIG. 4A, the method 400a may start, for instance, at block 401a where it may include obtaining, by at least one load sensor, a measurement of a load associated with one or more objects placed on a surface of the first, second or third panel(s). In response, the method 400a includes sending, by that load sensor, to the terminal station device, an indication of the load measurement, as represented by block 403a. At block 405a, the method 400a may include receiving, by the first actuator coupled to the roller mechanism of at least one leg supporting the outer expandable frame, from the terminal station device, an indication to enable movement of the roller mechanism. In response, the method 400a may include enabling, by the first actuator, the movement of the roller mechanism, as represented by block 407a. At block 409a, the method 400a may include receiving, by the second actuator coupled to the outer or inner movable mechanism, from the terminal station device, an indication to move the outer or inner movable mechanism. In response, the method 400a may include moving, by the second actuator, the outer or inner movable mechanism so as to move the first or second panel along the longitudinal plane of the inner expandable frame between the fully unexpanded position, the fully expanded position, or any position in between, as represented by block 411a. At block 413a, the method 400a may include receiving, by the third actuator coupled to at least one leg supporting the outer expandable frame, from the terminal station device, an indication to level the bagging station device. In response, the method 400a may include leveling, by the third actuator, the bagging station device.

FIG. 4B illustrates one embodiment of a method 400b by a terminal station device of expanding the bagging station device with various aspects as described herein. In FIG. 4B, the method 400b may start, for instance, at block 401b where it includes receiving, from each load sensor, an indication of a load measurement associated with one or more objects placed on the surface of the first, second or third panel(s). In response, the method 400b may include determining the load of the one or more objects placed on the surface of the first or second panel based on the load measurement(s) of the load sensor, as represented by block 403b. At block 405b, the method 400b may include determining to enable movement of the roller mechanism, with the roller mechanism being coupled to at least one leg supporting the outer expandable frame of the bagging station device. In response, the method 400b may include sending, to the first actuator coupled to the roller mechanism, an indication to enable the movement of the roller mechanism, as represented by block 407b. At block 409b, the method 400b may include determining to move the first or second panel between the fully unexpanded position, the fully expanded position, or any position in between. In response, the method 400b may include sending, to the second actuator coupled to the inner or outer moveable mechanism, an indication to move the inner or outer moveable mechanism so as to move the first or second panel between the fully unexpanded position, the fully expanded position, or any position in between, as represented by block 411b. At block 413b, the method 400b may include determining to level the bagging station device. In response, the method 400b may include sending, to the third actuator coupled to at least one leg supporting the outer expandable frame, an indication to level the bagging station device, as represented by block 415b.

FIG. 5 illustrates another embodiment of a self-service checkout system 500 having a terminal station device 501 and a bagging station device 541 in accordance with various aspects as described herein. In FIG. 5, system 500 includes processing circuitry 502 that is operatively coupled to input/output interface 505, neural network circuit 509, network connection interface 511, power source 513, memory 515 including random access memory (RAM) 517, read-only memory (ROM) 519 and storage medium 521, communication subsystem 531, and/or any other component, or any combination thereof.

The input/output interface 505 may be configured to provide a communication interface to an input device, output device, or input and output device. The system 500 may be configured to use an output device via input/output interface 505. An output device 561 may use the same type of interface port as an input device. For example, a USB port or a Bluetooth port may be used to provide input to and output from the system 500. The output device may be a speaker, a sound card, a video card, a display, a monitor, a printer, an actuator, an emitter, a smartcard, another output device, or any combination thereof. The system 500 may be configured to use an input device via input/output interface 505 to allow a user to capture information into the system 500. The input device may include a touch-sensitive or presence-sensitive display, an optical sensor, (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical or image sensor, an infrared sensor, a proximity sensor, another like sensor, or any combination thereof. As shown in FIG. 500, the input/output interface 505 can be configured to provide a communication interface to components of the terminal station device 501 such as the scanners 114, 116, the display device 118, the payment processing mechanism 122, the printer 124, the coupon slot mechanism 125, the cash acceptor mechanism 126, light emitting devices 130, the like, or any combination thereof. Further, the input/output interface 505 can be configured to provide a communication interface to components of the bagging station device 541 such as the first, second and third actuators 163, 161, 165, the one or more load sensors 155, the like, or any combination thereof.

In FIG. 5, storage medium 521 may include operating system 523, application program 525, data 527, resolution data 529, the like, or any combination thereof. In other embodiments, storage medium 521 may include other similar types of information. Certain devices may utilize all of the components shown in FIG. 5, or only a subset of the components. The level of integration between the components may vary from one device to another device. Further, certain devices may contain multiple instances of a component, such as multiple processors, memories, neural networks, network connection interfaces, transceivers, etc.

In FIG. 5, processing circuitry 502 may be configured to process computer instructions and data. Processing circuitry 502 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 502 may include two central processing units (CPUs). Data may be information in a form suitable for use by a computer.

In FIG. 5, the neural network circuit 509 may be configured to learn to perform tasks by considering examples such as performing object detection of certain objects in an image. In one example, a first neural network circuit is configured to perform object detection of persons in an image. For example, the neural network circuit 509 may use image data to detect the number of people in a self-checkout queue. In FIG. 5, the network connection interface 511 may be configured to provide a communication interface to network 543*a*. The network 543*a* may encompass wired and/or wireless networks such as a local-area network (LAN), a wide-area network (WAN), a computer network, a wireless network, a telecommunications network, another like network or any combination thereof. For example, network 543*a* may comprise a Wi-Fi network. The network connection interface 511 may be configured to include a receiver and a transmitter interface used to communicate with one or more other devices over a communication network according to one or more communication protocols, such as Ethernet, TCP/IP, SONET, ATM, or the like. The network connection interface 511 may implement receiver and transmitter functionality appropriate to the communication network links (e.g., optical, electrical, and the like). The transmitter and receiver functions may share circuit components, software or firmware, or alternatively may be implemented separately.

The RAM 517 may be configured to interface via a bus 503 to the processing circuitry 501 to provide storage or caching of data or computer instructions during the execution of software programs such as the operating system, application programs, and device drivers. The ROM 519 may be configured to provide computer instructions or data to processing circuitry 501. For example, the ROM 519 may be configured to store invariant low-level system code or data for basic system functions such as basic input and output (I/O), startup, or reception of keystrokes from a keyboard that are stored in a non-volatile memory. The storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, the storage medium 521 may be configured to include an operating system 523, an application program 525 such as web browser, web application, user interface, browser data manager as described herein, a widget or gadget engine, or another application, and a data file 527. The storage medium 521 may store, for use by the system 500, any of a variety of various operating systems or combinations of operating systems.

The storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. The storage medium 521 may allow the system 500*a-b* to access computer-executable instructions, application programs or the like, stored on transitory or non-transitory memory media, to off-load data, or to upload data. An article of manufacture, such as one utilizing a communication system may be tangibly embodied in the storage medium 521, which may comprise a device readable medium.

The processing circuitry 501 may be configured to communicate with network 543*b* using the communication subsystem 531. The network 543*a* and the network 543*b* may be the same network or networks or different network or networks. The communication subsystem 531 may be configured to include one or more transceivers used to communicate with the network 543*b*. For example, the communication subsystem 531 may be configured to include one or more transceivers used to communicate with one or more remote transceivers of another device capable of wireless communication according to one or more communication protocols, such as IEEE 802.11, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software, or firmware, or alternatively may be implemented separately.

In FIG. 5, the communication functions of the communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 531 may include cellular communication, Wi-Fi communication, Bluetooth communication, and GPS communication. The network 543*b* may encompass wired and/or wireless networks such as a local-area network (LAN), a wide-area network (WAN), a computer network, a wireless network, a telecommunications network, another like network or any combination thereof. For example, the network 543*b* may be a cellular network, a Wi-Fi network, and/or a near-field network. The power source 513 may be configured to provide alternating current (AC) or direct current (DC) power to components of the system 500*a-b*.

The features, benefits and/or functions described herein may be implemented in one of the components of the system 500 or partitioned across multiple components of the system 500. Further, the features, benefits, and/or functions described herein may be implemented in any combination of hardware, software, or firmware. In one example, communication subsystem 531 may be configured to include any of the components described herein. Further, the processing circuitry 501 may be configured to communicate with any of such components over the bus 503. In another example, any of such components may be represented by program instructions stored in memory that when executed by the processing circuitry 501 perform the corresponding functions described herein. In another example, the functionality of any of such components may be partitioned between the processing circuitry 501 and the communication subsystem 531. In another example, the non-computationally intensive functions of any of such components may be implemented in software or firmware and the computationally intensive functions may be implemented in hardware.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts for illustrative purposes, but the embodiments are similarly applicable in other contexts not explicitly described.

In one exemplary embodiment, a method is performed by a bagging station device of a self-checkout system configured to operationally couple to a terminal station device of the self-checkout system. Further, the bagging station device has an outer expandable frame, an inner expandable frame having an inner movable mechanism coupled between first and second inner frame portions, first and second panels disposed on the corresponding first and second inner frame portions, and a set of load sensors disposed between the inner and outer expandable frames. The method includes sending, by at least one load sensor, to the terminal station device, an indication of a measurement of a load associated with one or more objects placed on a surface of the first or second panel. In addition, the inner moveable mechanism is operable to enable the first or second panel to move along a longitudinal plane of the inner expandable frame between a fully unexpanded position and a fully expanded position. Each load sensor is operable to measure a load associated with one or more objects placed on the surface of the first or second panel including when the inner expandable frame is in the fully unexpanded position or the fully expanded position.

In another exemplary embodiment, the method further includes obtaining, by each load sensor, the load measurement associated with the one or more objects placed on the surface of the first or second panel.

In another exemplary embodiment, the method further includes receiving, by a first actuator coupled to a roller mechanism of at least one leg supporting the outer expandable frame, from the terminal station device, an indication to enable movement of the roller mechanism between the fully unexpanded position and the fully expanded position. Further, the first actuator is operable to enable or disable the movement of the roller mechanism.

In another exemplary embodiment, the method further includes enabling, by the first actuator, the movement of the roller mechanism.

In another exemplary embodiment, the method further includes receiving, by a second actuator coupled to the outer or inner movable mechanism, from the terminal station device, an indication to move the outer or inner movable mechanism so as to move the first or second panel along the longitudinal plane of the inner expandable frame between the fully unexpanded position and the fully expanded position. Further, the second actuator is operable to move the outer or inner movable mechanism.

In another exemplary embodiment, the method further includes moving, by the second actuator, the outer or inner movable mechanism so as to move the first or second panel along the longitudinal plane of the inner expandable frame between the fully unexpanded position and the fully expanded position responsive to receiving the move indication.

In another exemplary embodiment, the method further includes receiving, by a third actuator coupled to at least one leg supporting the outer expandable frame, from the terminal station device, an indication to level the bagging station device.

In another exemplary embodiment, the method further includes leveling, by the third actuator, the bagging station device.

In another exemplary embodiment, the bagging station device further includes a third panel configured to be disposed on the inner expandable frame associated with the movable mechanism when in the fully expanded position so as to form a contiguous surface with the first and second panels. Further, each load sensor is operable to measure a load associated with one or more objects placed on the surface of any of the first, second and third panels.

In one exemplary embodiment, a bagging station device includes an outer expandable frame, an inner expandable frame, first and second panels, and a set of load sensors. The inner expandable frame has an inner movable mechanism coupled between the first and second inner frame portions. Further, the inner moveable mechanism is configured to enable the first or second panel to move along a longitudinal plane of the inner expandable frame between a fully unexpanded position and a fully expanded position. The first and second panels are disposed on the corresponding first and second inner frame portions. In addition, the set of load sensors are coupled between the inner and outer expandable frames, with each load sensor being operable to measure a load associated with one or more objects placed on a surface of the first or second panel including when the inner expandable frame is in the fully unexpanded position and the fully expanded position.

In one exemplary embodiment, a method is performed by a terminal station device of a self-checkout system configured to operationally couple to a bagging station device of the self-checkout system. Further, the bagging station device has an outer expandable frame, an inner expandable frame having an inner movable mechanism coupled between first and second inner frame portions, first and second panels disposed on the corresponding first and second inner frame portions, and a set of load sensors coupled between the inner and outer expandable frames. The method includes receiving, by the terminal station device, from at least one load sensor, a measurement of a load associated with one or more objects placed on a surface of the first or second panel. Also, the inner moveable mechanism is configured to enable the first or second panel to move along a longitudinal plane of the inner expandable frame between a fully unexpanded position and a fully expanded position. In addition, each load sensor is operable to measure a load associated with one or more objects placed on the surface of the first or second panel including when the inner expandable frame is in the fully unexpanded position or the fully expanded position.

In another exemplary embodiment, the method further includes determining to enable movement of a roller mechanism between the fully unexpanded position and the fully expanded position. Further, the roller mechanism is coupled to at least one leg supporting the outer expandable frame.

In another exemplary embodiment, the method further includes sending, by the terminal station device, to a first actuator that is coupled to the roller mechanism, an indication to enable movement of the roller mechanism. Further, the first actuator is operable to enable or disable the movement of the roller mechanism.

In another exemplary embodiment, the method further includes determining to move the first or second panel along the longitudinal plane of the inner expandable frame between the fully unexpanded position and the fully expanded position.

In another exemplary embodiment, the method further includes sending, by the terminal station device, to a second actuator coupled to the outer or inner movable mechanism, an indication to move the outer or inner movable mechanism so as to move the first or second panel along the longitudinal plane of the inner expandable frame between the fully unexpanded position and the fully expanded position. Further, the second actuator is operable to move the outer or inner movable mechanism.

In another exemplary embodiment, the method further includes determining to level the bagging station device.

In another exemplary embodiment, the method further includes sending, by the terminal station device, to a third actuator coupled to at least one leg supporting the outer expandable frame, an indication to level the bagging station device, with the third actuator being operable to level the bagging station device.

In another exemplary embodiment, the method further includes determining the load associated with the one or more objects placed on the surface of the first or second panel based on the load measurements.

In another exemplary embodiment, the receiving step is responsive to sending, by the terminal station device, to each load sensor, an indication that includes a request for the load measurement.

In one exemplary embodiment, a terminal station device of a self-checkout system includes processing circuitry and a memory, with the memory containing instructions executable by the processing circuitry whereby the processor is configured to receive, from each of a set of load sensors coupled between inner and outer expandable frames of a bagging station device of the self-checkout system, a measurement of a load associated with one or more objects placed on a surface of a first or second panel of the bagging station device. Further, the inner expandable frame includes an inner moveable mechanism coupled between first and second inner frame portions and configured to enable the first or second panel to move along a longitudinal plane of the inner expandable frame between a fully unexpanded position and a fully expanded position. Each load sensor is operable to measure a load associated with one or more objects placed on the surface of the first or second panel including when the inner expandable frame is in the fully unexpanded position or the fully expanded position.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip;

an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method, comprising:
    by a bagging station device of a self-checkout system configured to operationally couple to a terminal station device of the self-checkout system, the bagging station device having an outer expandable frame, an inner expandable frame having an inner movable mechanism coupled between first and second inner frame portions, first and second panels disposed on the corresponding first and second inner frame portions, and a set of load sensors disposed between the inner and outer expandable frames,
    sending, by each load sensor, to the terminal station device, an indication of a load measurement associated with one or more objects placed on a surface of the first or second panel, wherein the inner movable mechanism is operable to enable the first or second panel to move along a longitudinal plane of the inner expandable frame between a fully unexpanded position and a fully expanded position, each load sensor being operable to measure a load associated with one or more objects placed on the surface of the first or second panel including when the inner expandable frame is in the fully unexpanded position or the fully expanded position.

2. The method of claim 1, further comprising:
    obtaining, by each load sensor, the load measurement associated with the one or more objects placed on the surface of the first or second panel.

3. The method of claim 1, further comprising:
    receiving, by a first actuator coupled to a roller mechanism of at least one leg supporting the outer expandable frame, from the terminal station device, an indication to enable movement of the roller mechanism between the fully unexpanded position and the fully expanded position, with the first actuator being operable to enable or disable the movement of the roller mechanism.

4. The method of claim 3, further comprising:
    enabling, by the first actuator, the movement of the roller mechanism.

5. The method of claim 1, further comprising:
    receiving, by a second actuator coupled to the inner movable mechanism, from the terminal station device, an indication to move the inner movable mechanism so as to move the first or second panel along the longitudinal plane of the inner expandable frame between the fully unexpanded position and the fully expanded position, with the second actuator being operable to move the inner movable mechanism.

6. The method of claim 5, further comprising:
    moving, by the second actuator, the inner movable mechanism so as to move the first or second panel along the longitudinal plane of the inner expandable frame between the fully unexpanded position and the fully expanded position responsive to receiving the move indication.

7. The method of claim 1, further comprising:
    receiving, by a third actuator coupled to at least one leg supporting the outer expandable frame, from the terminal station device, an indication to level the bagging station device.

8. The method of claim 7, further comprising:
    leveling, by the third actuator, the bagging station device.

9. The method of claim 1, wherein the bagging station device further includes:
    a third panel configured to be disposed on the inner expandable frame associated with the movable mechanism when in the fully expanded position, with each load sensor being operable to measure a load associated with one or more objects placed on the surface of the first, second or third panel.

10. A bagging station device, comprising:
    an outer expandable frame;
    an inner expandable frame having an inner movable mechanism coupled between first and second inner frame portions, with first and second panels disposed on the corresponding first and second inner frame portions and the inner movable mechanism being configured to enable the first or second panel to move along a longitudinal plane of the inner expandable frame between a fully unexpanded position and a fully expanded position; and
    a set of load sensors that are coupled between the inner and outer expandable frames, with each load sensor being operable to measure a load associated with one or more objects placed on a surface of the first or second panel including when the inner expandable frame is in the fully unexpanded position and the fully expanded position.

11. A method, comprising:
by a terminal station device of a self-checkout system configured to operationally couple to a bagging station device of the self-checkout system, the bagging station device having an outer expandable frame, an inner expandable frame having an inner movable mechanism coupled between first and second inner frame portions, first and second panels disposed on the corresponding first and second inner frame portions, and a set of load sensors coupled between the inner and outer expandable frames,
receiving, by the terminal station device, from each load sensor, a measurement of a load associated with one or more objects placed on a surface of the first or second panel, with the inner movable mechanism being configured to enable the first or second panel to move along a longitudinal plane of the inner expandable frame between a fully unexpanded position and a fully expanded position, each load sensor being operable to measure a load associated with one or more objects placed on the surface of the first or second panel including when the inner expandable frame is in the fully unexpanded position or the fully expanded position.

12. The method of claim 11, further comprising:
determining to enable movement of a roller mechanism between the fully unexpanded position and the fully expanded position, with the roller mechanism being coupled to at least one leg supporting the outer expandable frame.

13. The method of claim 12, further comprising:
sending, by the terminal station device, to a first actuator that is coupled to the roller mechanism, an indication to enable movement of the roller mechanism, with the first actuator being operable to enable or disable the movement of the roller mechanism.

14. The method of claim 11, further comprising:
determining to move the first or second panel along the longitudinal plane of the inner expandable frame between the fully unexpanded position and the fully expanded position.

15. The method of claim 14, further comprising:
sending, by the terminal station device, to a second actuator coupled to the inner movable mechanism, an indication to move the inner movable mechanism so as to move the first or second panel along the longitudinal plane of the inner expandable frame between the fully unexpanded position and the fully expanded position, with the second actuator being operable to move the inner movable mechanism.

16. The method of claim 11, further comprising:
determining to level the bagging station device.

17. The method of claim 16, further comprising:
sending, by the terminal station device, to a third actuator coupled to at least one leg supporting the outer expandable frame, an indication to level the bagging station device, with the third actuator being operable to level the bagging station device.

18. The method of claim 11, wherein the bagging station device further includes:
an intermediate panel, with the movable mechanism being further configured to receive the intermediate panel when towards the fully expanded position, the set of load sensors being further collectively operable to measure the load of the one or more objects placed on the first and second panels and the intermediate panel.

19. The method of claim 11, further comprising:
determining the load associated with the one or more objects placed on the surface of the first or second panel based on the load measurements.

20. The method of claim 11, wherein the receiving step is responsive to sending, by the terminal station device, to each load sensor, an indication that includes a request for the load measurement.

* * * * *